UNITED STATES PATENT OFFICE.

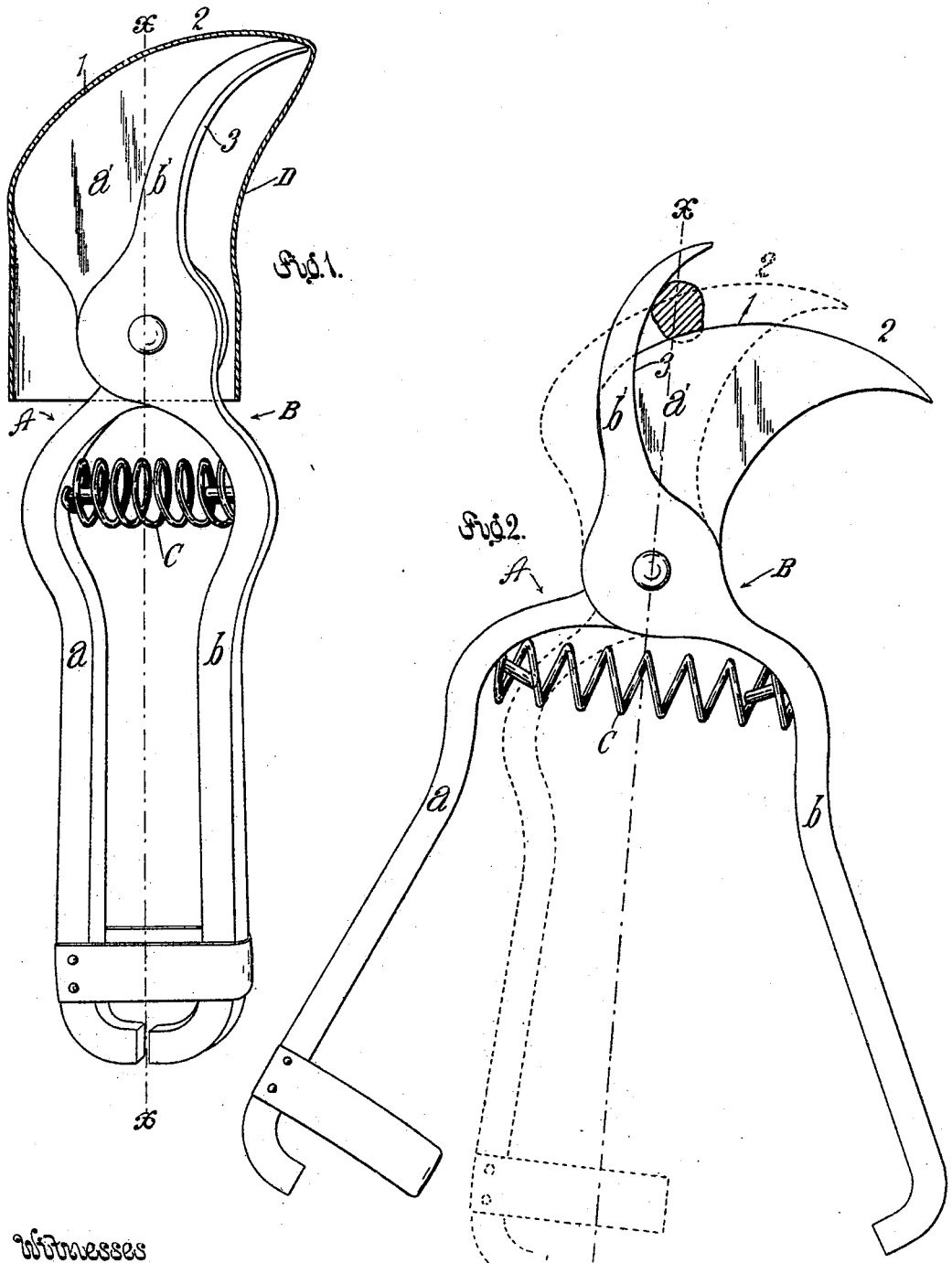

WILLIAM BALLERSTEDT, OF ALTADENA, CALIFORNIA.

PRUNING IMPLEMENT.

SPECIFICATION forming part of Letters Patent No. 619,462, dated February 14, 1899.

Application filed December 23, 1897. Serial No. 663,258. (No model.)

*To all whom it may concern:*

Be it known that I, WILLIAM BALLERSTEDT, a subject of the German Emperor, (but having declared my intention to become a citizen of the United States,) residing at Altadena, in the county of Los Angeles and State of California, have invented a new and useful Improvement in Pruning Implements, of which the following is a specification.

The object of this invention is to provide a superior simple pruning implement which for a given size will cut with a perfectly smooth cut limbs of comparatively large size and without marring or bruising the limb. The entire length of the cutting edge of my newly-invented implement can be sharpened without unpivoting the parts. The implement is also convenient for use as a hook to draw limbs or branches into reach of the workman.

By my invention the implement is so constructed that in the act of cutting the edge of the blade is always drawn across the limb much more rapidly than it is pushed through the limb, so that the cutting is done by a drawing motion and without splitting, bruising, or marring the limb. My pruning implement may be made of various different sizes suitable for different work. In the accompanying drawings I have shown an implement adapted for hand use; but it is to be understood that the invention can be applied to much larger implements.

My invention comprises a pruning implement having in one piece a handle and a blade and in another piece a handle and a limb-holding finger, the two pieces being pivoted together, the blade having a cutting edge which curves from the outer side of the handle toward and across the medial line of the implement and terminates in a line which is substantially at right angles to such medial line and on the opposite side of said medial line from said handle, the holding-finger having a curved engaging face which curves toward the other side of its handle and lies when the implement is closed wholly on the same side of the medial line of the implement as does the handle of said finger, the curves of the cutting edge of the blade and the engaging face of the holding-finger being normally divergent from intersection to point.

My invention more particularly comprises a pruning implement consisting of an involute blade with handle, a holding-finger with handle and with curved engaging face extending across the involute cutting-face of the blade, and a pivot pivoting the blade and finger together and located at the evolute of the blade and external to the extended curve of the engaging face of the finger.

The accompanying drawings illustrate my invention.

Figure 1 is a perspective view of my implement closed and contained in a pocket or case, a fragment of which is shown. Fig. 2 is a view of the implement open. Dotted lines in this view indicate the position of parts when in the act of cutting, a section of a limb being shown partially cut.

A indicates a single piece comprising a handle $a$ and an involute blade $a'$.

B indicates another piece comprising the handle $b$ and the limb-holding finger $b'$. The cutting edge 1 of the blade is an involute curve which extends from the outer side of its handle across the medial line $x\,x$ of the implement and terminates in a line 2, which is substantially at right angles to such medial line and on the opposite side of said medial line from the handle pertaining to the blade.

3 indicates the curved engaging face of the limb-holding finger $b'$. This face extends from the outer side of the handle pertaining to such finger and lies when the implement is closed wholly on the same side of the medial line of the implement as does the handle of said finger, and the curves of the cutting edge of the blade and of the engaging face of the holding-finger are normally divergent from intersection or heel to point, so that when the implement is opened and closed the blade will be drawn across the edge of the cutting-finger throughout its entire length more rapidly than it is moved toward the cutting-finger to close the space between the engaging face of the finger and the cutting edge of the blade. This produces a uniform draw-cut from end to end of the cutting edge by simpler means than heretofore known.

In practical use the implement is held open by the spring C and is placed against the limb with the limb in the space between the finger and the edge of the blade. Then when the implement is closed the finger holds the limb while the edge of the blade is drawn rapidly through the limb from heel to point, at the same time moving the intersecting-point gradually toward the point of the finger, as indicated by the dotted lines in Fig. 2.

D indicates a pocket or case to cover the blade.

Now, having described my invention, what I claim as new, and desire to secure by Letters Patent, is—

1. In a pruning implement having in one piece a handle and a blade and in another piece a handle and a holding-finger, the two pieces being pivoted together; the blade having a cutting edge which curves from the outer side of its handle toward and across the medial line of the implement and terminates in a line which is substantially at right angles to such medial line and on the opposite side of said medial line from the handle; and the holding-finger having a curved engaging face which extends from the outer side of its handle and lies, when the implement is closed, wholly on the same side of the medial line of the implement, as does the handle of said finger; the curves of the cutting edge of the blade and the engaging face of the holding-finger being normally divergent from intersection to point.

2. A pruning implement consisting of an involute blade with handle; a holding-finger with handle and with curved engaging face extending across the involute cutting edge of the blade; and a pivot pivoting the blade and finger together, and located at the evolute of the blade and external to the extended curve of the engaging face of the finger, substantially as set forth.

W. BALLERSTEDT.

Witnesses:
 JAMES R. TOWNSEND,
 F. M. TOWNSEND,
 L. SCHMIDT.